United States Patent [19]
Nishioka et al.

[11] Patent Number: 4,909,087
[45] Date of Patent: Mar. 20, 1990

[54] ROTARY TYPE TORQUE DETECTING DEVICE

[75] Inventors: Mitsutoshi Nishioka, Tokyo; Tsuneo Noma, Iwatsuki; Mitsuru Takagi, Asaka, all of Japan

[73] Assignee: Satake Chemical Equipment Mfg., Ltd., Moriquchi, Japan

[21] Appl. No.: 273,064

[22] Filed: Nov. 18, 1988

[30] Foreign Application Priority Data

Dec. 3, 1987 [JP] Japan .................... 62-183822[U]

[51] Int. Cl.⁴ .................................................. G01L 3/14
[52] U.S. Cl. .................................................. 73/862.29
[58] Field of Search .................... 73/862.29, 862.31, 59

[56] References Cited

U.S. PATENT DOCUMENTS

| 2,511,178 | 6/1950 | Rotors | 73/962.29 X |
| 3,285,057 | 11/1966 | Zurik | 73/862.29 X |

FOREIGN PATENT DOCUMENTS

2444035  3/1976  Fed. Rep. of Germany ... 73/862.29

Primary Examiner—Charles A. Ruehl
Attorney, Agent, or Firm—Oblon, Spivak, McClelland, Maier & Neustadt

[57] ABSTRACT

A rotary type torque detecting device characterized in that, in a casing, a motor holder supporting a motor is rotatably mounted and a torsion bar is connected at one end to the motor holder and at the other end to the casing. A torque detecting movable shaft of a magnetic sensor provided in the casing is connected to the motor holder. An output shaft is coupled to the rotating shaft of the motor. The driving motor is a compact, built-in motor, which produces a relatively large output voltage in accordance with a torque to be tested, facilitating the design of an amplifier for subsequent output amplification and great improvement in measuring accuracy.

9 Claims, 2 Drawing Sheets 4,909,087

ROTARY TYPE TORQUE DETECTING DEVICE

FIELD OF THE INVENTION

The present invention relates to a torque detecting device designed for use in agitators for agitation test and agitation torque measurement to be conducted in laboratories and other locations.

BACKGROUND OF THE INVENTION

Rotary torque detecting devices conventionally known are a mechanical type in which a coil spring is directly connected to a motor and a strain gauge type adapted to detect a pressure exerted on a body by utilizing constantan or an alloy of manganin and nickel.

In the mechanical type torque detecting device with a coil spring directly connected to a motor, torque detected is indicated by mechanical indicating means or other mechanism, and accordingly a low rate of amplification, a low detecting accuracy, and difficult connection of the device to a recorder or other equipment have been inevitable.

In the meantime, the strain gauge type torque detecting device adopts a method of detecting a change in resistance by the use of a bridge or the like; but has a shortcoming in that the output voltage is as little as 0.5 mV to 2 mV. Therefore, the design and manufacture of an amplifier becomes complicated in nature.

OBJECTS OF THE INVENTION

It is a first object of the present invention to provide a torque detecting device in which a driving motor is a built-in, compact motor, and a relatively large output voltage is produced in accordance with torque, thereby enabling easy design of amplifiers for output amplification and great improvements in measuring accuracy.

It is a second object of the present invention to provide a torque detecting device which is able to measure the aforementioned torque and the number of revolutions at the same time.

It is a third object of the present intention to provide a torque detecting device which is of simple construction and facilitates adjustment and maintenance.

It is a fourth object of the present invention to provide a torque detecting device in which a torsion bar can be protected from damage resulting from excessive torsion.

SUMMARY OF THE INVENTION

In order to attain these objects, the present invention is characterized in that a motor holder is rotatably mounted to hold a motor in a casing, a torsion bar is mounted with one end thereof connected to the motor holder and the other end connected to the casing, a movable shaft of a magnetic sensor provided in the casing is connected to the motor holder, and an output shaft is connected to the rotating shaft of the motor.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENT

Figure 1:
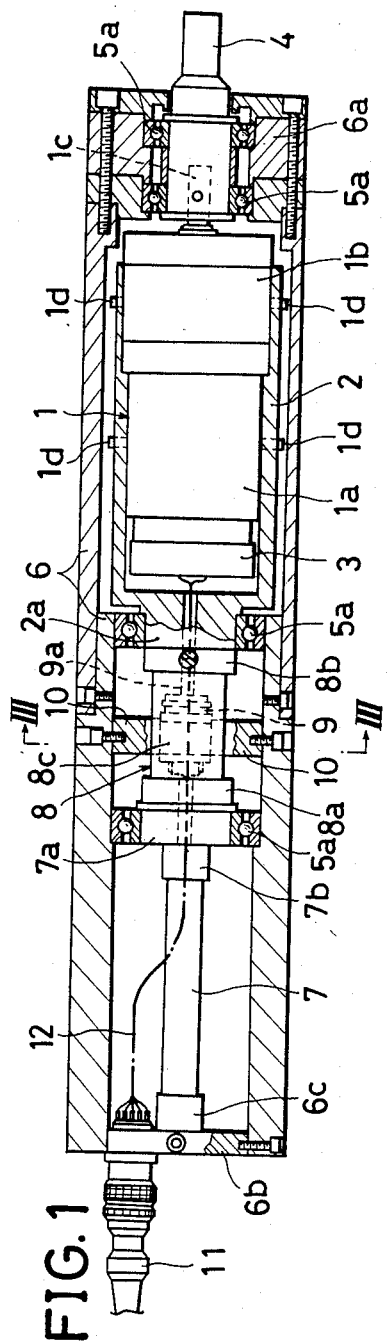
FIG. 1 is a plan view in section of one embodiment of the present invention.

One embodiment of the present invention will now be explained with reference to drawings.

Numeral (1) designates a motor section. This motor section (1) is constituted by a motor body (1a), a reduction gear section (1b), and a rotor shaft (1c). The motor section (1) is fitted and secured by screws (1d) ... (1d) within a hollow cylindrical motor holder (2) having a projecting end section (2a).

On the opposite end of the rotor shaft (1c) of the motor section (1) is mounted an encoder (3) which is designed to electrically detect the number of revolutions of the rotor shaft (1c) by using codes. Furthermore, on this rotor shaft (1c) secured by screws is the output shaft (4). The projecting end section (2a) of the motor holder (2) and the output shaft (4) are rotatably supported on bearings (5a), (5a) fitted in a flange (6a) fixed in the inner surface of a cylindrical casing (6) and in one end of the casing (6).

Figure 2:
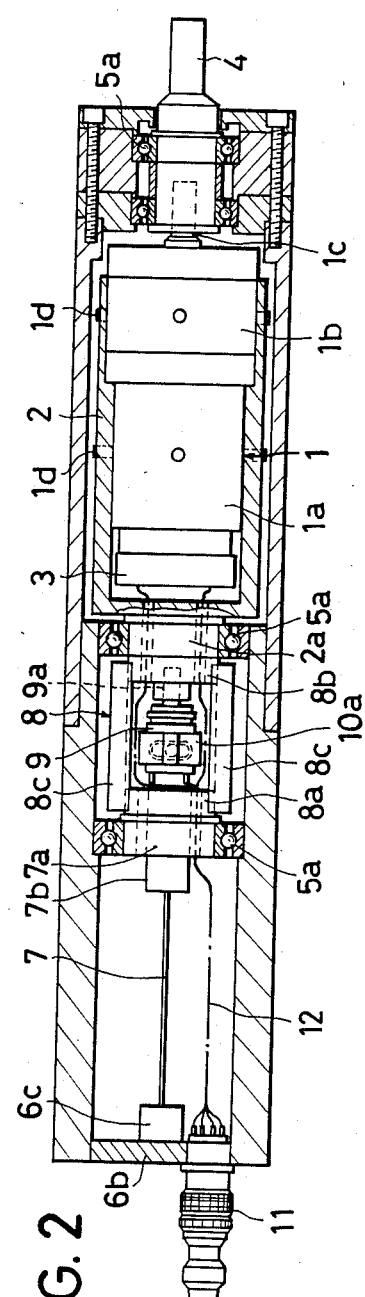
FIG. 2 is a front sectional view thereof.

At the other end of the casing (6) is mounted a flange (6b). From the center of this flange (6b) is protruding a fitting (6c) which fixedly supports one end of a torsion bar (7) made of a belt-like elastic material. (Note that the width of the torsion bar 7 shown in FIG. 1 is much greater than the thickness of the torsion bar 7 shown in FIG. 2.) The other end of this torsion bar (7) is fixedly secured on a mounting shaft (7b) of a first connecting member (7a) of approximately a circular disk type supported on the bearing (5a) fitted in the inside diameter of the casing (6), so that the torsion bar (7) can make a torsional motion. Numeral (8) designates a second connecting member. This second connecting member (8) is constituted by both annular plates (8a) and (8b) and opposite connecting plates (8c) and (8c) of curved section. One annular plate (8a) is fixedly mounted to the first connecting member (7a), while the other annular plate (8b) is securely mounted on the projecting end section (2a) of the motor holder (2) such that the motor section (1) and the front end of the torsion bar (7) can rotate together as one body.

Figure 3:
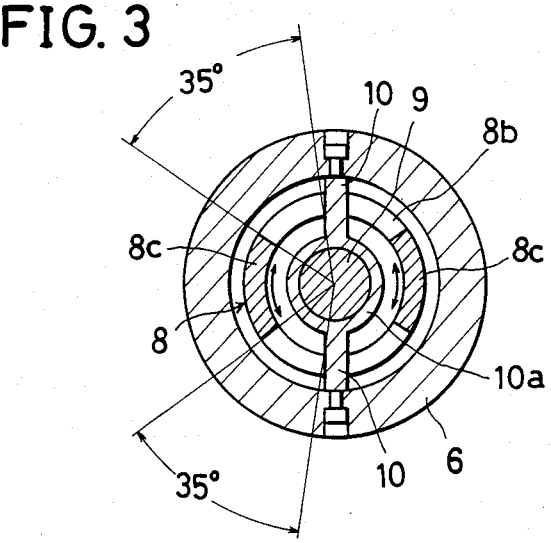
FIG. 3 is a sectional view taken along line III—III of FIG. 1.
Figure 4:
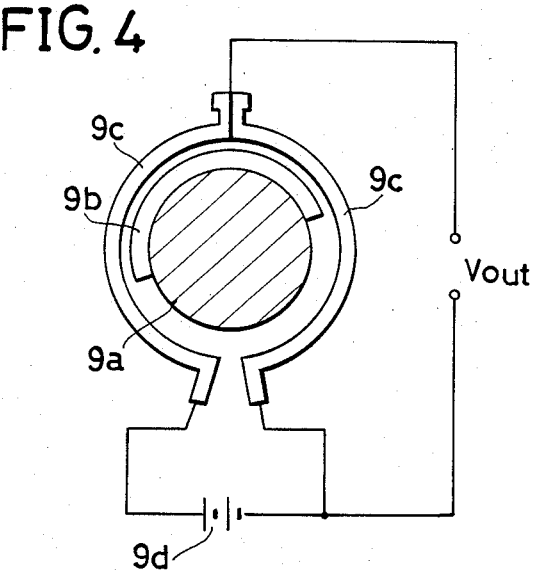
FIG. 4 is an enlarged explanatory view of a magnetic sensor.

Numeral (9) represents a magnetic sensor. This magnetic sensor (9), as shown in FIG. 4, is of a differential type comprising a movable shaft (9a), a permanent magnet (9b) semispherically disposed at the root of the movable shaft (9a), and a pair of nearly semicircular magnetic resistor elements (9c), (9c) arranged, with a clearance being provided for, outside of the permanent magnet (9b). As the movable shaft (9a) is turned, the magnetic sensor (9) produces an output voltage Vout corresponding to the angle of rotation of the movable shaft (9a). Numeral (9d) indicates a power source. The magnetic sensor (9) is embraced by a cylindrical sensor casing (10a) fixed in the inner end of arms (10), (10) protruding toward the center from the inside surface of the casing (6) as shown in FIG. 3. The movable shaft (9a) is fixed in the projecting end section (2a) of the motor holder (2).

Numeral (11) indicates an input-output connector provided on one flange (6) of the casing (6), and numeral (12) indicates a lead wire connected between the connector (11) to the magnetic sensor (9), the encoder (3), and the motor body (1a).

Operation of the device of the above-described constitution of the embodiment will now be explained.

When electric power is supplied from the input-output connector (11) to the motor body (1a), the motor rotates, and the the rotation of this motor is transmitted in order to the reduction gear section (1b), the rotor shaft (1c), and the output shaft (4), thus starting the torque detecting device. As there is produced a torque (i.e., load) at the output shaft (4), there occurs a counter torque correspondingly to the strength of the torque, applying a force of deceleration to the motor body (1a). However, since the motor body (1a) and the motor section (1) having the reduction gear section (1b) and the rotor shaft (1c) are secured to the motor holder (2) and supported on the bearings (5a) . . . (5a), the motor section (1) and the motor holder (2) are reversely turned in relation to the rotor shaft (1c) by the counter torque when there has occurred a torque. Because the projecting end section (2a) of the motor blade (2) is connected to one end of the torsion bar (7) through the second connecting member (8) having the curved connecting plates (8c), (8c) and the first connecting member (7a), and the other end of the torsion bar (7) is fixedly connected to the flange (6b) of the casing (6), the torsion bar 7 is twisted by an angle proportional to the reverse turn. With the torsion of the torsion bar (7), the detecting movable shaft (9a) of the magnetic sensor (9) fixed in the motor holder (2) is turned.

The cylindrical casing (10a) of the magnetic sensor (9), fixed to the casing (6) by the arms (10), (10), produces a voltage corresponding to the angle of rotation from the magnetic resistor elements (9c), (9c) in the magnetic sensor (9) as the detecting movable shaft (9a) rotates. The voltage thus produced is inputted into an amplifier (not shown), via the input-output connector (11), which in turn outputs a signal to indicate the torque. The output voltage Vout from the magnetic resistor elements (9c), (9c) is as much as about 500 mV, and therefore the device will not be affected with external noises. Moreover, the output voltage can easily be amplified by the amplifier, thereby enabling great improvement in torque measuring accuracy.

The maximum angle of torsion of the torsion bar (7) is controlled by the arc angle of the curved connecting plates (8c), (8c). In the embodiment of the present invention, the maximum angle is set to ±35 deg. That is, if the angle of torsion exceeds ±35 deg., the curved connecting plates (8c), (8c) of the second connecting member (8) will come in contact with the arms (10), (10) to prevent the angle of torsion from further increasing, thus protecting the torsion bar (7) from becoming damaged. The number of revolutions of the output shaft (4) is outputted, simultaneously with a detected torque, through the input-output connector (11) by the encoder (3) provided in the motor section (1).

Obviously, numerous modifications and variations of the present invention are possible in light of the above teachings. It is therefore to be understood that, within the scope of the appended claims, the invention may be practiced otherwise than as specifically described herein.

What is new and desired to be secured by Letters Patent of the United States is:

1. A rotary type torque detecting device comprising:
   (a) a motor having a rotating shaft;
   (b) a casing;
   (c) a motor holder which supports said motor and which is rotatably mounted in said casing;
   (d) a torsion bar having a first end thereof connected to said motor holder and a second end thereof connected to said casing;
   (e) a magnetic sensor provided in said casing and connected to said motor holder, said magnetic sensor comprising:
      (i) a sensor casing;
      (ii) a magnetic resistor element provided in said sensor casing;
      (iii) a shaft movably mounted in said sensor casing; and
      (iv) a permanent magnet which movably interlocks with said shaft to change the surface area facing said magnetic resistor element; and
   (f) an output shaft connected to said rotating shaft of said motor.

2. A rotary type torque detecting device as claimed in claim 1 wherein an encoder is operatively connected to said motor.

3. A rotary type torque detecting device as claimed in claim 1 wherein:
   (a) said rotary type torque detecting device further comprises a first and a second connecting member;
   (b) said first end of said torsion bar is fixedly connected to said first connecting member;
   (c) said first connecting member is rotatably supported on said casing; and
   (d) said first connecting member is fixedly connected to an end portion of said motor holder through said second connecting member.

4. A rotary type detecting device as claimed in claim 3 wherein said second connecting member comprises:
   (a) a plurality of annular plates and
   (b) a plurality of opposing connecting plates of curved section and connect said annular plates.

5. A rotary type torque detecting device as claimed in claim 4 wherein:
   (a) said rotary type torque detecting device further comprises a plurality of arms projectively extending from an inside surface of said casing through a predetermined clearance provided between said connecting plates and
   (b) said sensor casing is attached to inner end portions of said arms.

6. A rotary type torque detecting device comprising:
   (a) a motor having a rotatable shaft;
   (b) a casing;
   (c) a motor holder which supports said motor and which is rotatably mounted in said casing;
   (d) a torsion bar having one end thereof connected to said motor holder and a second end thereof connected to said casing;
   (e) a magnetic sensor having a detecting movable shaft provided in said casing and connected to said motor holder;
   (f) an output shaft connected to said rotatable shaft of said motor;
   (g) a first connecting member; and
   (h) a second connecting member; wherein:
   (i) said one end of said torsion bar is fixedly connected to said first connecting member;
   (j) said first connecting member is rotatably supported on said casing; and
   (k) said first connecting member is fixedly connected to an end portion of said motor holder through said second connecting member.

7. A rotary type torque detecting device as claimed in claim 6 wherein:
   (a) said magnetic sensor comprises a sensor casing;
   (b) a magnetic resistor element is provided in said sensor casing;
   (c) a shaft is movably mounted in said sensor casing; and
   (d) a permanent magnet movably interlocks with said shaft to change the surface area facing said magnetic resistor element.

8. A rotary type torque detecting device as claimed in claim 6 wherein said second connecting member comprises:
   (a) a plurality of annular plates and
   (b) a plurality of opposing connecting plates of curved section which connect said annular plates.

9. A rotary type torque detecting device as claimed in claim 8 wherein:
   (a) said rotary type torque detecting device further comprises a plurality of arms projectively extending from an inside surface of said casing through a predetermined clearance provided between said connecting plates;
   (b) said magnetic sensor comprises a sensor casing; and
   (c) said sensor casing is attached to inner end portions of said arms.

* * * * *